United States Patent
Chen et al.

(10) Patent No.: US 9,179,519 B2
(45) Date of Patent: Nov. 3, 2015

(54) PHASE-SHIFT DIMMING FOR LED CONTROLLER AND THE METHOD THEREOF

(71) Applicants: Da Chen, Chengdu (CN); Zhengwei Zhang, Chengdu (CN); Kaiwei Yao, San Jose, CA (US)

(72) Inventors: Da Chen, Chengdu (CN); Zhengwei Zhang, Chengdu (CN); Kaiwei Yao, San Jose, CA (US)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 153 days.

(21) Appl. No.: 13/728,989

(22) Filed: Dec. 27, 2012

(65) Prior Publication Data
US 2013/0169173 A1    Jul. 4, 2013

(30) Foreign Application Priority Data
Dec. 30, 2011   (CN) .......................... 2011 1 0453485

(51) Int. Cl.
H05B 37/02   (2006.01)
H05B 33/08   (2006.01)

(52) U.S. Cl.
CPC ............ *H05B 37/02* (2013.01); *H05B 33/0815* (2013.01); *H05B 33/0827* (2013.01); *Y02B 20/346* (2013.01)

(58) Field of Classification Search
USPC .................. 315/194, 195, 246, 291, 299, 360
See application file for complete search history.

(56) References Cited

U.S. PATENT DOCUMENTS

| 8,258,714 B2* | 9/2012 | Liu ................................ 315/250 |
| 8,502,481 B2* | 8/2013 | Hagino et al. ................. 315/318 |
| 2010/0231279 A1* | 9/2010 | Walker et al. .................. 327/237 |
| 2012/0049761 A1* | 3/2012 | Yu et al. ......................... 315/294 |

* cited by examiner

*Primary Examiner* — Thuy Vinh Tran
(74) *Attorney, Agent, or Firm* — Perkins Coie LLP (57) ABSTRACT

A phase-shift dimming circuit for LED controller having a delay signal generator configured to receive a PWM input signal, and to provide a plurality of pairs of set signal and reset signal, the set signal and the reset signal respectively having pulses; and a plurality of latches configured to respectively receive the plurality of pairs of set signal and reset signal to generate a plurality of PMW output signals, each of the PWM output signals having pulses, and wherein the rising edge of the pulses of the PWM output signals is based on the corresponding set signal pulses, and the falling edge of the pulses of the PWM output signals is based on the corresponding reset signal pulses.

3 Claims, 13 Drawing Sheets

FIG. 10

PHASE-SHIFT DIMMING FOR LED CONTROLLER AND THE METHOD THEREOF

CROSS-REFERENCE TO RELATED APPLICATION(S)

This application claims priority to and the benefit of Chinese Patent Application No. 201110453485.6, filed Dec. 30, 2011, which is incorporated herein by reference in its entirety.

TECHNICAL FIELD

The present invention relates generally to electrical circuits, and more particularly but not exclusively to phase-shift dimming circuit for LED controller and the method thereof.

BACKGROUND

LEDs (Light Emitting Diode) are widely applied in the electronic display devices because of small size, low power consumption, high luminous efficiency, long life and so on. Analog dimming method and PWM (Pulse Width Modulation) dimming method are the conventional ways applied in a LED controller, and the PWM dimming method which modulates the pulse width of a dimming control signal to adjust brightness of LEDs is applied more widely today. In conventional PWM dimming method, usually one dimming control signal controls a plurality of LED strings. As a result, the brightness of the LEDs changes too sharply between ON and OFF, which reduces image quality. Meanwhile, the plurality of output dimming control signals which respectively controls the LED strings may be phase shifted compared with the input dimming control signal, but the duty cycle of them could not be adjusted.

The present invention pertains to provide a phase-shift dimming circuit which generates a plurality of phase-shifted output dimming control signals. Moreover, the duty cycle of the plurality of output dimming control signals may be controlled to be changed.

SUMMARY

It is an object of the present invention to provide a phase-shift dimming circuit for LED controller and the method thereof to solve the above problems.

In accomplishing the above and other objects, there has been provided, in accordance with an embodiment of the present invention, a phase-shift dimming circuit for LED controller, comprising: a delay signal generator configured to receive a PWM input signal, and to provide a plurality of pairs of set signal and reset signal, the set signal and the reset signal respectively having pulses; and a plurality of latches configured to respectively receive the plurality of pairs of set signal and reset signal to generate a corresponding plurality of PWM output signals, each of the PWM output signals having pulses, and wherein the rising edge of the pulses of the PWM output signals is based on the corresponding set signal pulses, and the falling edge of the pulses of the PWM output signals is based on the corresponding reset signal pulses.

Furthermore, there has been provided, in accordance with an embodiment of the present invention, A LED phase-shift dimming control method for controlling a plurality of LED strings, comprising: receiving a PWM input signal; and duplicating and converting the PWM input signal to a plurality of phase-shifted PWM output signals to respectively control the a plurality of LED strings, wherein there are adjustable phase difference between the successive PWM output signals, and wherein the duty cycle of the PWM output signals are adjustable too.

The presented phase-shift dimming circuit for LED controller and the method thereof generate a plurality of phase-shift PWM output signals to respectively control a plurality of LED strings with simple circuit and low cost, wherein the phase difference between the successive PWM output signal and the duty cycle of the PWM output signal are both adjustable.

The use of the same reference label in different drawings indicates same or like components.

DETAILED DESCRIPTION

In the present invention, numerous specific details are provided, such as examples of circuits, components, and methods, to provide a thorough understanding of embodiments of the invention. Persons of ordinary skill in the art will recognize, however, that the invention can be practiced without one or more of the specific details, and could be adopted in many applications besides the phase-shift dimming circuits, for example, the invention could also be applied in interleaving circuits. In other instances, well-known details are not shown or described to avoid obscuring aspects of the invention.

Figure 1:
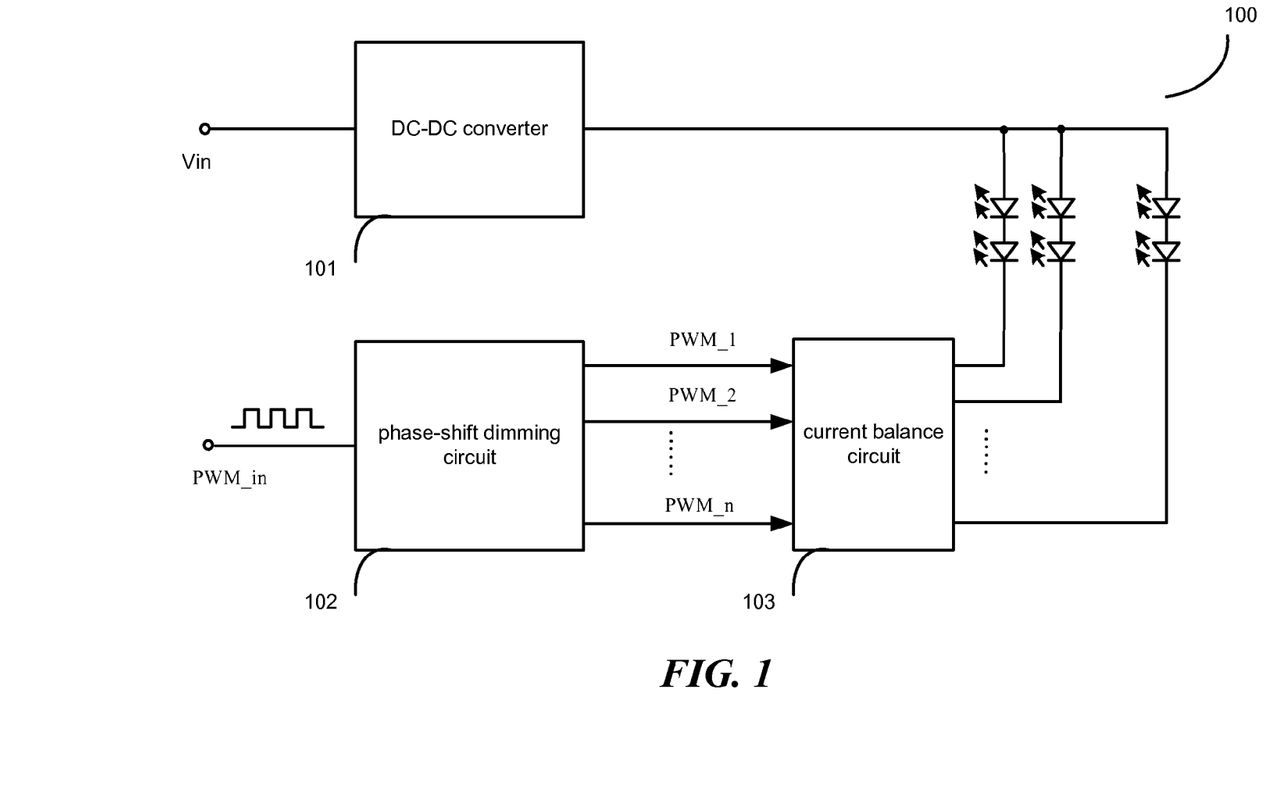
FIG. 1 schematically shows a LED controller 100 in accordance with an embodiment of the present invention.

FIG. 1 schematically shows a LED controller 100 in accordance with an embodiment of the present invention. The LED controller 100 comprises a DC/DC converter 101, a phase-shift dimming circuit 102 and a current balance circuit 103.

The DC/DC converter 101 controls power conversion from an input signal Vin to an output signal in order to supply DC power to a plurality of LED strings. The phase-shift dimming circuit 102 is configured to receive a PWM input signal PWM_in, and to duplicate the PWM input signal PWM_in to a plurality of PWM output signals PWM_1, ..., PWM_n (n=2M, M is a positive integer), wherein there is a phase difference T/n between the successive PWM output signals, and wherein T is the cycle length of the PWM input signal PWM_in. The current balance circuit 103 is coupled to the phase-shift dimming circuit 102 to receive the PWM output signals with shifted phase and to balance the current of the LED strings based thereupon.

Figure 2A:
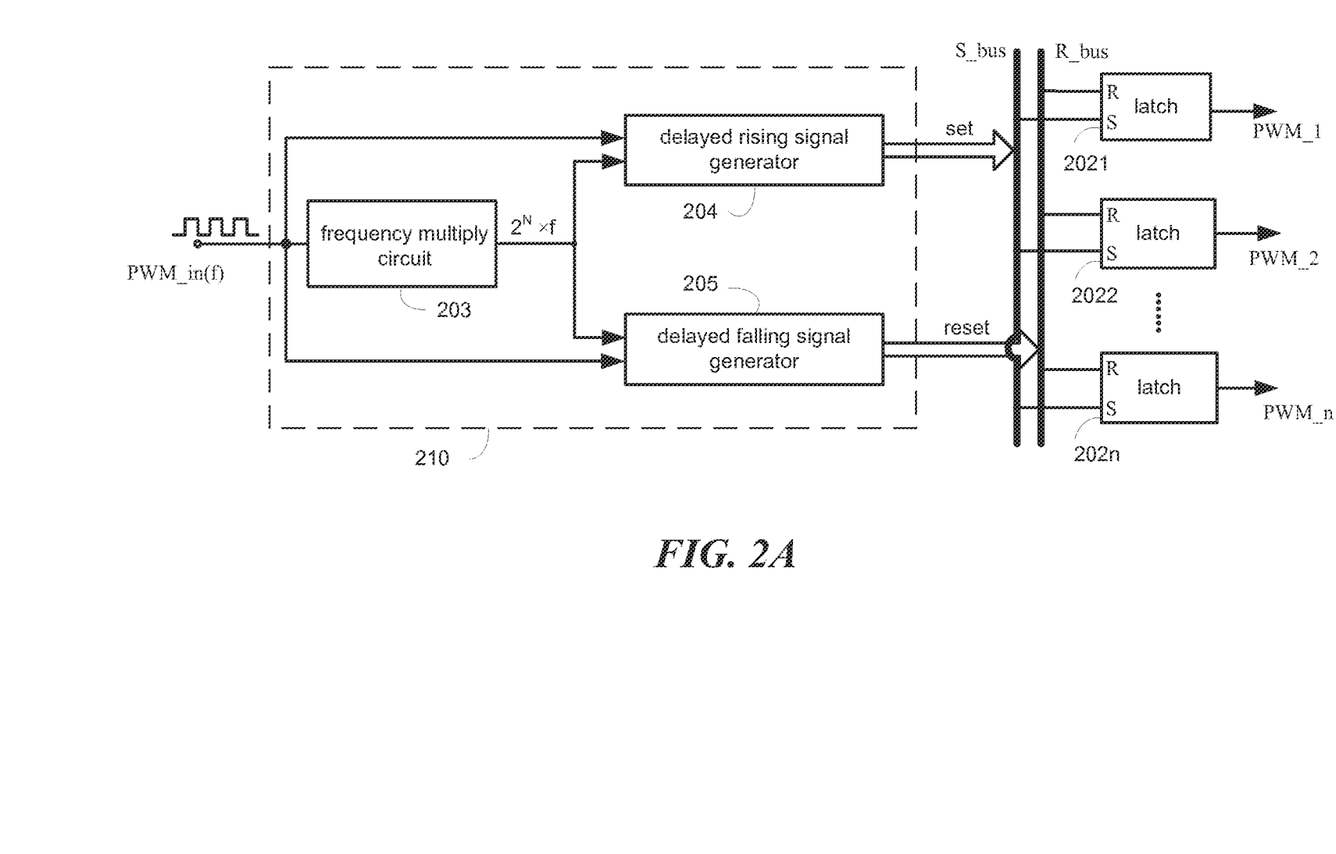
FIG. 2A schematically shows a circuit configuration of the phase-shift dimming circuit 102 in accordance with an embodiment of the present invention.

FIG. 2A schematically shows a circuit configuration of the phase-shift dimming circuit 102 in accordance with an embodiment of the present invention. The phase-shift dimming circuit 102 in FIG. 2A provides phase-shifted PWM output signals when the duty cycle of the PWM input signal PWM_in is fixed. The phase-shift dimming circuits 102 comprises a delay signal generator 210 and a plurality of latches 2021~202n.

In one embodiment, the delay signal generator 210 receives the PWM input signal PWM_in, and provides n pairs of set signal and reset signal. Each of the latches 2021~202n receives one pair of set signal and reset signal, and provides a phase-shifted PWM output signal. The pulse of the set signal determines the rising edge of the corresponding phase-shifted PWM output signal, while the reset signal determines the falling edge of the pulse of the corresponding phase-shifted PWM output signal.

In one embodiment, the delay signal generator 210 generates a plurality of phased-shifted delayed rising signals and phase-shifted delayed falling signals. The delay signal generator 210 comprises: a frequency multiply circuit 203, a delayed rising signal generator 204 and a delayed falling signal generator 205.

The frequency multiply circuit 203 receives the PWM input signal PWM_in which may have a frequency of f and provides a square signal having a frequency of $2N \times f$ ($N \geq 1$) to the delayed rising signal generator 204 and the delayed falling signal generator 205. In one embodiment, the PWM input signal PWM_in is not a square signal and the frequency multiply circuit 203 further comprises a frequency divider. Firstly, the frequency divider shapes the PWM input signal PWM_in to a square signal, and then the frequency of the square signal is multiplied. In one embodiment, the frequency divider comprises a plurality of counters.

In the example of FIG. 2A, the delayed rising signal generator 204 receives the square signal provided by the frequency multiply circuit 203 and the PWM input signal PWM_in. Starting from the rising edge of the PWM input signal PWM_in, the delayed rising signal generator 204 successively generates n set signals set_1, set_2, ..., set_n having a shifted phase between each other, and respectively provides the set signals to the latches 2021, 2022, ..., 202n through a set bus S_bus.

In the example of FIG. 2A, the delayed falling signal generator 205 receives the square signal provided by the frequency multiply circuit 203 and the PWM input signal PWM_in. Starting from the falling edge of the PWM input signal PWM_in, the delayed falling signal generator 205 successively generates n reset signals reset_1, reset_2, ..., reset_n having shifted phase between each other, and respectively provides the reset signals to the latches 2021, 2022, ..., 202n through a reset bus R_bus. The reset signals reset_1, reset_2, ..., reset_n combined with the corresponding set signals set_1, set_2, ..., set_n respectively control the corresponding latch. For sake of clearly illustration, the set signals set_1, set_2, ..., set_n are all represented by a label "set", and reset signals reset_1, reset_2, ..., reset_n are all represented by a label "reset".

Each of the n latches 2021~202n has a reset terminal R and a set terminal S. The set terminals are coupled to the set bus S_bus to receive the corresponding set signals set_1, set_2, ..., set_n provided by the delayed rising signal generator 204. The reset terminals are coupled to the reset bus R_bus to receive the corresponding reset signals reset_1, reset_2, ..., reset_n provided by the delayed falling signal generator 205. The latch 2021 provides a phase-shifted PWM output signal PWM_1 to a first LED string, the latch 2022 provides a phase-shifted PWM output signal PWM_2 to a second LED string, ..., and the latch 202n provides a phase shifted PWM output signal PWM_n to an nth LED string, and so on. Persons of ordinary skill in the art should know that, any circuits which could perform the function of reset, set and latch may be applied as the latches in FIG. 2A.

Figure 2B:
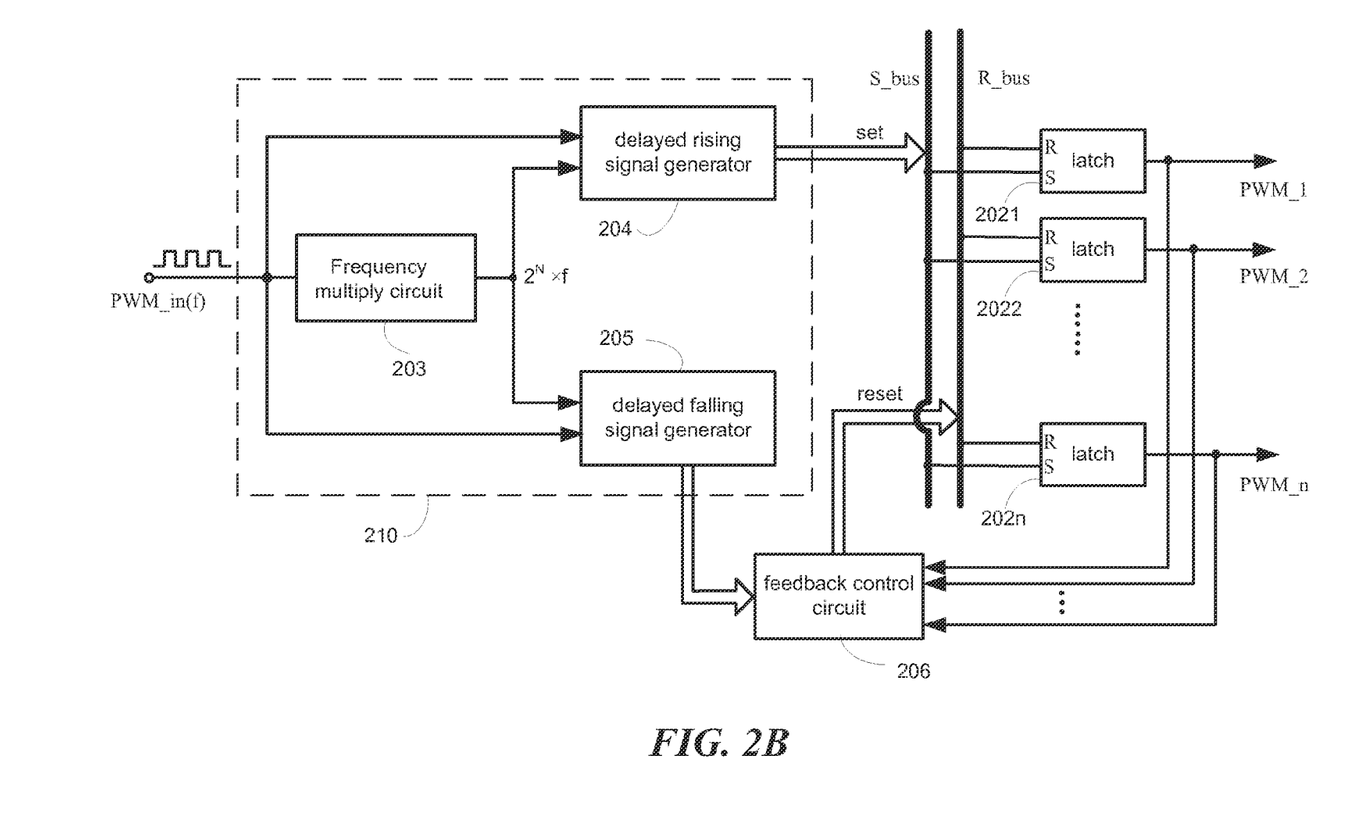
FIG. 2B schematically shows another circuit configuration of the phase-shift dimming circuit 102 in accordance with an embodiment of the present invention.

FIG. 2B schematically shows another circuit configuration of the phase-shift dimming circuit 102 in accordance with an embodiment of the present invention. The phase-shift dimming circuit 102 in FIG. 2B provides PWM output signals with shifted phase between each other and with adjusted duty cycle compared with the PWM input signal PWM_in. Compared with the phase-shift dimming circuit 102 in FIG. 2A, the phase-shift dimming circuit 102 in FIG. 2B further comprises a feedback control circuit 206. The feedback control circuit 206 is coupled to the latches 2021~202n to receive the phase-shifted PWM output signals and is coupled to the delayed falling signal generator 205 to receive the signals generated by the delayed falling signal generator 205, wherein based on the PWM output signals and signals generated by the delayed falling signal generator 205, the feedback control circuit 206 provides the reset signals to the reset bus R_bus.

Figure 3A:
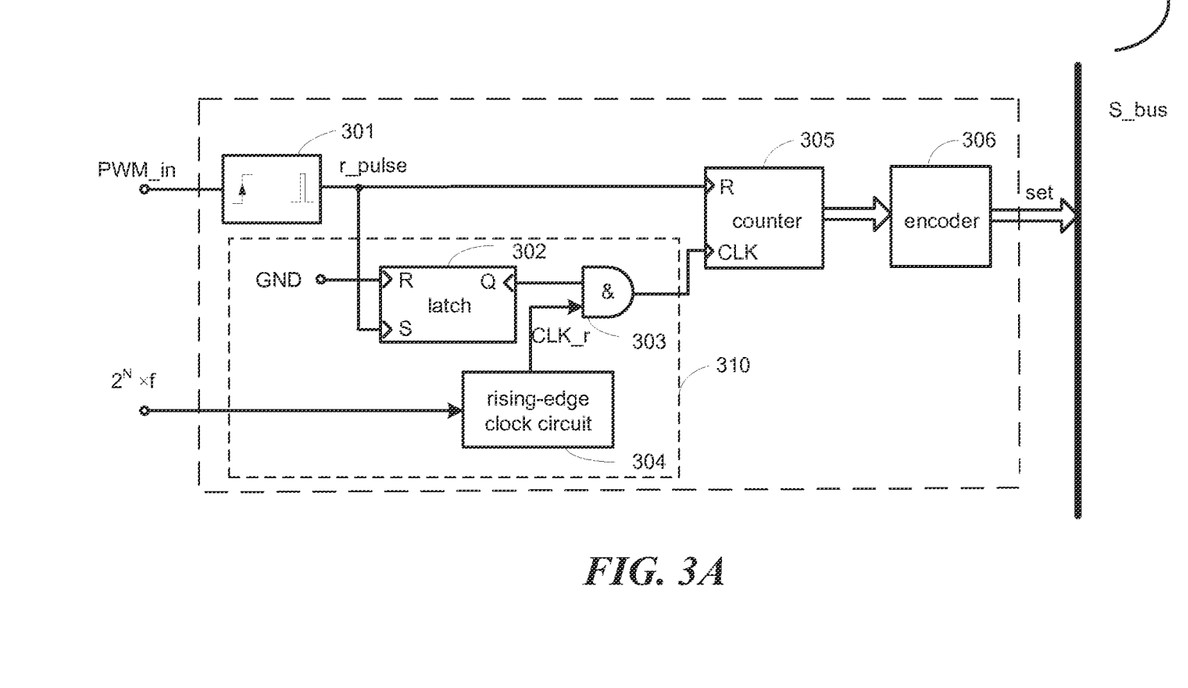
FIG. 3A schematically shows a circuit configuration of the delayed rising signal generator 204 in FIGS. 2A and 2B in accordance with an embodiment of the present invention.

FIG. 3A schematically shows a circuit configuration of the delayed rising signal generator 204 in FIGS. 2A and 2B in accordance with an embodiment of the present invention. As shown in FIG. 3A, a rising-edge pulse generator 301 is configured to receive the PWM input signal PWM_in, and to provide a rising-edge pulse signal r_pulse to a set terminal of a latch 302 and a reset terminal of a first counter 305 to synchronize the phase-shift dimming circuit 102. The rising-edge pulse signal r_pulse has pulse at every rising edge of the PWM input signal PWM_in.

The latch 302 has a reset terminal connected to a ground reference GND, and is set by the rising-edge pulse signal r_pulse at every rising edge of the PWM input signal PWM_in. An output signal of the latch 302 is provided to an input terminal of an AND gate 303. A rising-edge clock circuit 304 is configured to receive the square signal provided by the frequency multiply circuit 203, and to provide a rising clock signal CLK_r having a frequency corresponding to the shifted phase between two successive PWM output signals to another input terminal of the AND gate 303. For example, if the phase difference between the adjacent PWM output signals is T/4, then the frequency of the rising clock signal CLK_r is 4×f. In one embodiment, the latch 302, the AND gate 303 and the rising-edge clock circuit 304 constitute a rising-edge clock generator 310 as shown in FIG. 3A. In some embodiments, especially in the applications that synchronization accuracy is not highly required, the latch 302 and the AND gate 303 may be omitted.

In one embodiment, the rising-edge clock circuit 304 comprises a frequency divider. The rising-edge clock circuit 304 provides the rising clock signal CLK_r to the first counter 305 with suitable frequency corresponding to the phase difference between the two successive PWM output signals. The AND gate 303 performs logical AND operation on the two input signals and provides the result to a clock terminal "CLK" of the first counter 305. The first counter 305 is reset by the rising-edge pulse signal r_pulse at every rising edge of the PWM input signal PWM_in, and then starts counting the rising clock signal CLK_r. The first counter 305 provides a binary digit signal with M bits to a first encoder 306, wherein n=2M (M is natural number). The first encoder 306 encodes the binary digit signal, and generates 2M set signals to the set bus S_bus. In one embodiment, M=2 and the phase difference between the adjacent PWM output signals is T/4.

Figure 3B:
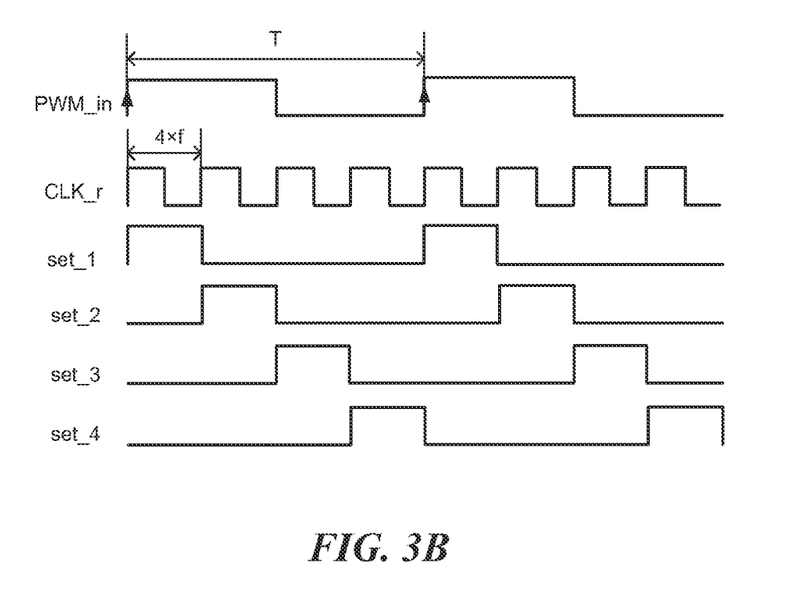
FIG. 3B shows waveforms of signals in the circuit of FIG. 3A.

FIG. 3B shows waveforms of signals in the circuit of FIG. 3A. As shown in FIG. 3B, the duty cycle of the PWM input signal PWM_in is 50%, the cycle length is T, and the frequency is f. In order to provide PWM output signals with a phase difference of T/4 between the adjacent signals, the rising-edge clock circuit 304 receives the square signal with a frequency of 2N×f, and provides the rising clock signal CLK_r with a frequency of 4×f. From the rising edge of the PWM input signal PWM_in, the first encoder 306 generates 4 signals set_1, set_2, set_3 and set_4, wherein there is a phase difference T/4 between the successive signals.

Figure 4A:
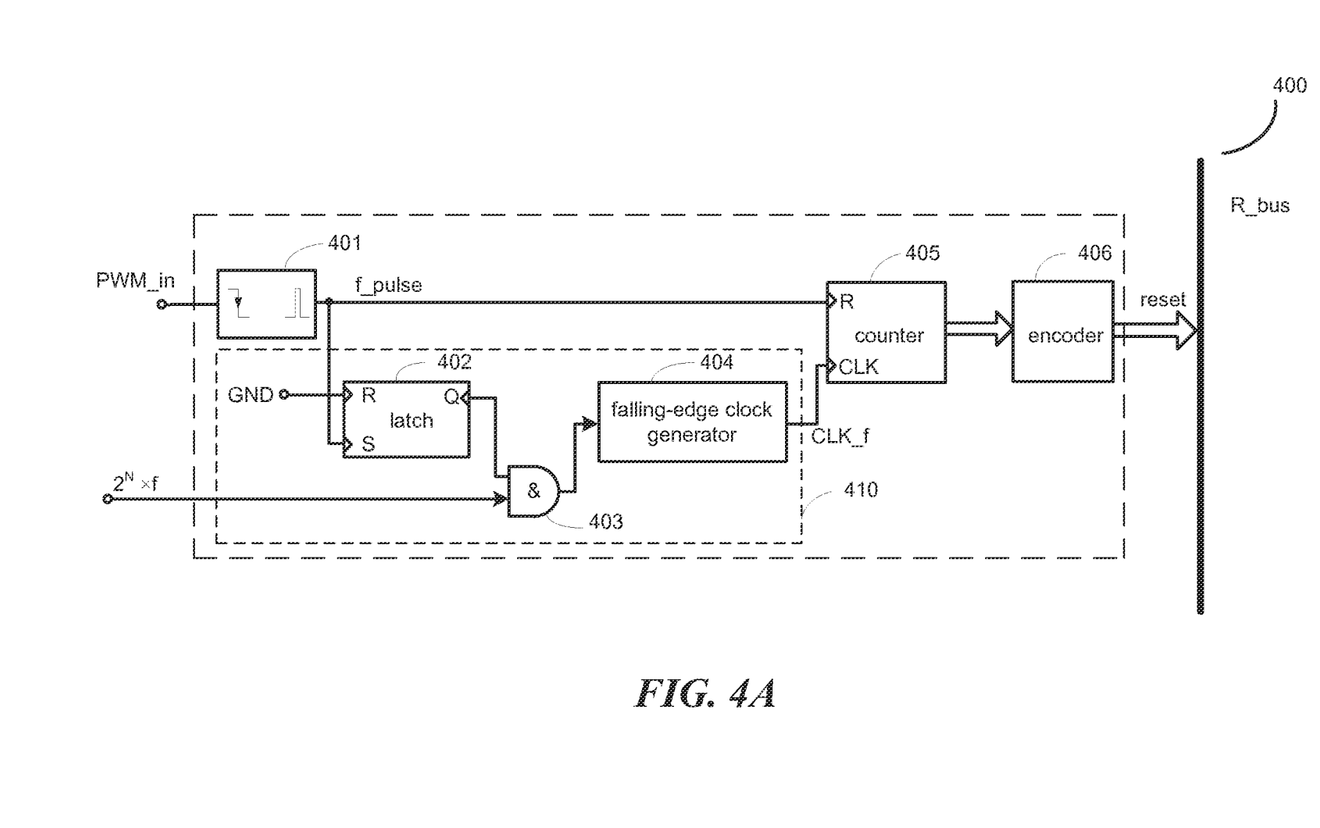
FIG. 4A schematically shows a circuit configuration of the delayed falling signal generator 205 in FIGS. 2A and 2B in accordance with an embodiment of the present invention.

FIG. 4A schematically shows a circuit configuration of the delayed falling signal generator 205 in FIGS. 2A and 2B in accordance with an embodiment of the present invention. As shown in FIG. 4A, a first falling-edge pulse generator 401 is configured to receive the PWM input signal PWM_in, and to provide a falling-edge pulse signal f pulse to a set terminal of a latch 402 and a reset terminal of a second counter 405 to synchronize the phase-shift dimming circuit 102. The falling-edge pulse signal f pulse has a pulse at every falling edge of the PWM input signal PWM_in.

The latch 402 has a reset terminal connected to the ground reference GND, and is set by the falling-edge pulse signal f pulse at every falling edge of the PWM input signal PWM_in. An output signal of the latch 402 is provided to a first input terminal of an AND gate 403. The AND gate 403 has a second input terminal configured to receive the square signal provided by the frequency multiply circuit 203. The AND gate 403 performs logic AND operation on the two input signals, and provides the result to the falling-edge clock generator 404. The falling-edge clock generator 404 receives the signal provided by the AND gate 403, and provides a falling clock signal CLK_f having a frequency corresponding to the shifted phase between two successive PWM output signals to a clock terminal of the second counter 405. For example, if the phase difference between the adjacent PWM output signals is T/4, then the frequency of the falling clock signal CLK_f is 4×f. Because the frequency of the square signal generated by the frequency multiply circuit 203 is 2N×f, which is much higher than the frequency f of the PWM input signal PWM_in, the falling edge of the PWM input signal PWM_in and the rising edge of the falling clock signal CLK_f will be synchronized with almost no error. In one embodiment, the latch 402, the AND gate 403 and the falling-edge clock generator 404 constitute a falling-edge clock generator 410 as shown in FIG. 4A. In some embodiments, especially in the applications that synchronization accuracy is not highly required, the latch 402 and the AND gate 403 may be omitted.

In one embodiment, the falling-edge clock generator 404 comprises a frequency divider. The falling-edge clock generator 404 provides the falling clock signal CLK_f to the second counter 405 with suitable frequency corresponding to the phase difference between two successive PWM output signals. Because the delay time between the falling edge of the PWM input signal PWM_in and the reset signals generated by the second encoder 406 could be adjusted by the falling-edge clock generator 205, the duty cycle of the PWM output signals could be changed. The second counter 405 is reset by the falling-edge pulse signal f pulse at every falling edge of the PWM input signal PWM_in, and then the second counter 405 counts the falling clock signal CLK_f. The second counter 405 provides a binary digit signal with M bits to the second encoder 406, wherein n=2M (M is natural number). The second encoder 406 encodes the binary digit signal, and generates 2M reset signals to the reset bus R_bus. In one embodiment, M=2 and the phase difference between the adjacent PWM output signals is T/4.

Figure 4B:
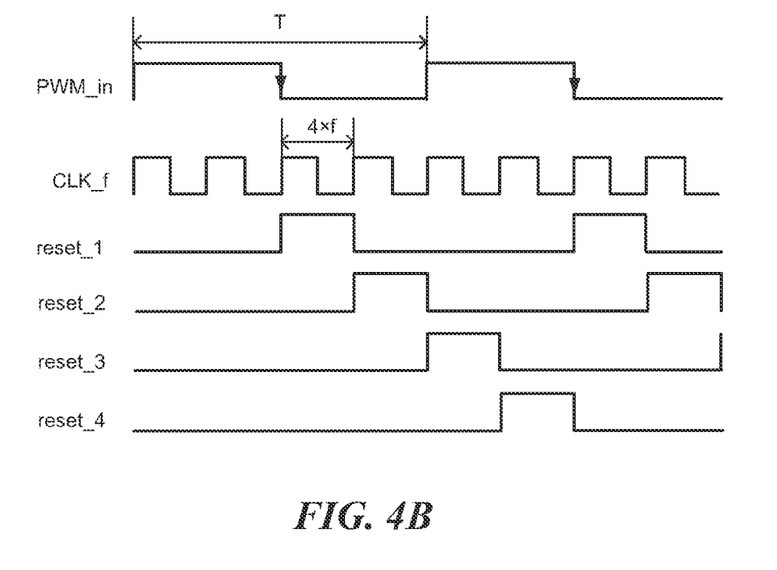
FIG. 4B shows waveforms of signals in the circuit of FIG. 4A.

FIG. 4B shows waveforms of signals in the circuit of FIG. 4A. As shown in FIG. 4B, the duty cycle of the PWM input signal PWM_in is 50%, the cycle length is T, and the frequency is f. In order to provide PWM output signals with a phase difference of T/4 between the adjacent signals, the falling-edge clock generator 404 receives the square signal with a frequency of 2N×f, and provides the falling clock signal CLK_f with a frequency of 4×f. From the falling edge of the PWM input signal PWM_in, the second encoder 406 generates 4 signals reset_1, reset_2, reset_3 and reset_4, wherein the delay time between each adjacent signal is T/4.

Figure 5:
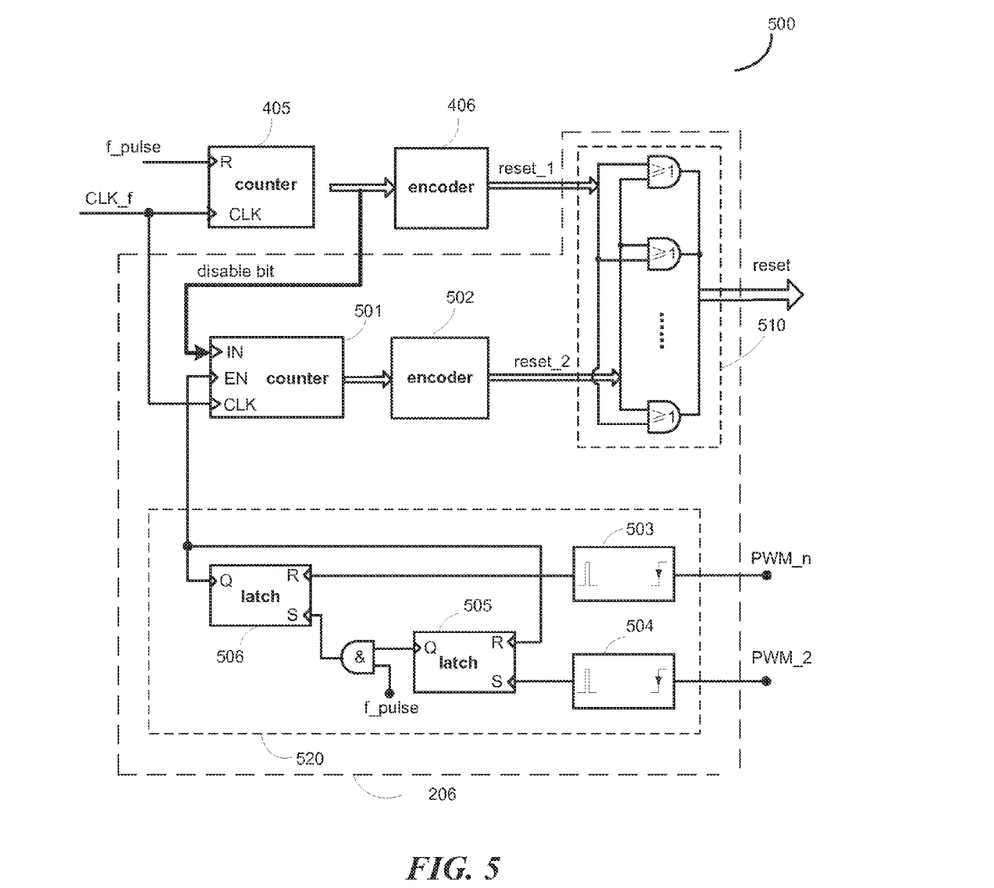
FIG. 5 schematically shows a circuit configuration of the feedback control circuit 206 in accordance with an embodiment of the present invention.

FIG. 5 schematically shows a circuit configuration of the feedback control circuit 206 in accordance with an embodiment of the present invention. As shown in FIG. 5, the second counter 405 counts the falling clock signal CLK_f, and provides the result to the second encoder 406 if the second counter 405 has not been reset by the falling edge of the PWM input signal PWM_in. Then the second encoder 406 generates a first set "reset_1" of 2M reset signals to the OR gate array 510.

When the second counter 405 is reset by the falling-edge pulse signal f pulse at the falling edge of the next cycle, the second counter 405 provides the binary digit signal to a third counter 501 and then starts a new counting. The third counter 501 counts the falling clock signal CLK_f from the binary digit signal, and provides the result to a third encoder 502. The third encoder 502 provides a second set "reset_2" of 2M reset signals to an OR gate array 510.

In the feedback control circuit 206, the third counter 501 is controlled by a feedback signal provided by a falling-edge detector 520, wherein the feedback signal enables the third counter 501 at the falling edge of the second PWM output signal PWM_2 and disables the third counter 501 at the falling edge of the last PWM output signal PWM_n. The falling edge of the second PWM output signal PWM_2 is detected by a second falling-edge pulse generator 503 and the falling edge of the last PWM output signal PWM_n is detected by a third falling-edge pulse generator 504. The feedback signal maintains the value as at the falling edge of the PWM input signal PWM_in of the current cycle but may be changed at the falling edge of the PWM input signal PWM_in of the next cycle. The latch 505 is set in response to the falling edge of the PWM output signal PWM_2 before the falling edge of the PWM input signal PWM_in of the next cycle. Thus at the falling edge of the PWM input signal PWM_in of the next cycle, the feedback signal provided to an enable terminal of the third counter 501 becomes high (valid). As a result, the third counter 501 stops following the second counter 405 and begins to count the falling clock signal CLK_f independently. The feedback signal becomes low (invalid) at the falling edge of the last PWM output signal PWM_n, and thus the third counter 501 is disabled. Then the third counter 501 stops counting, and sends the result to the third encoder 502 and follows the second counter 405 again. So that the third counter 501 could be synchronized with the second counter 405. The OR gate array 510 performs the logical OR operation on the first set "reset_1" of 2M reset signals and the corresponding second set "reset_2" of 2M reset signals respectively, and provides the resulted set "reset" of reset signals to the reset bus R_bus.

Figure 6:
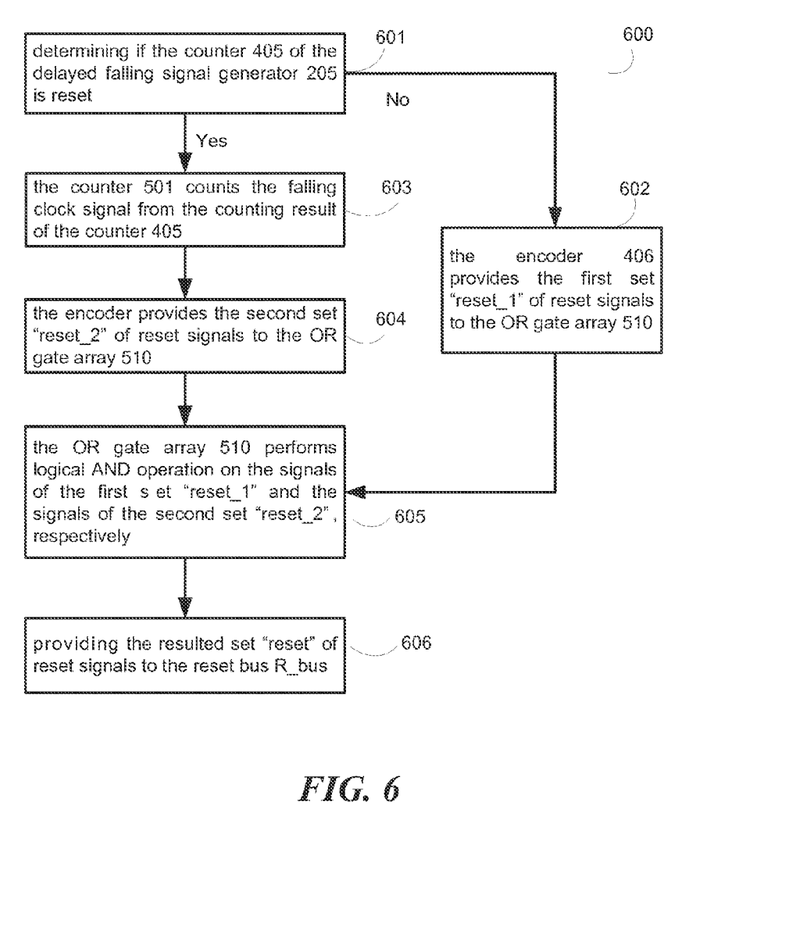
FIG. 6 shows a flow chart 600 of the control scheme of the circuit in FIG. 5.

FIG. 6 shows a flow chart 600 of the control scheme of the circuit in FIG. 5. Step 601, determining if the second counter 405 of the delayed falling signal generator 205 is reset, in other words, determining if the counting of the second counter 405 is interrupted by the falling edge of the PWM input signal PWM_in of the next cycle. If not, go to step 602, the second encoder 406 provides the first set "reset_1" of reset signals to the OR gate array 510.

If the second counter 405 is reset by the falling edge of the PWM input signal PWM_in of the next cycle, then go to: step 603, the third counter 501 counts the falling clock signal from the counting result of the second counter 405; step 604, the encoder provides the second set "reset_2" of reset signals to the OR gate array 510; step 605, the OR gate array 510 performs logical OR operation on the first set "reset_1" of reset signals and the second set "reset_2" of reset signals, respectively; and step 606, providing the resulted set "reset" of reset signals to the reset bus R_bus.

Figure 7A:
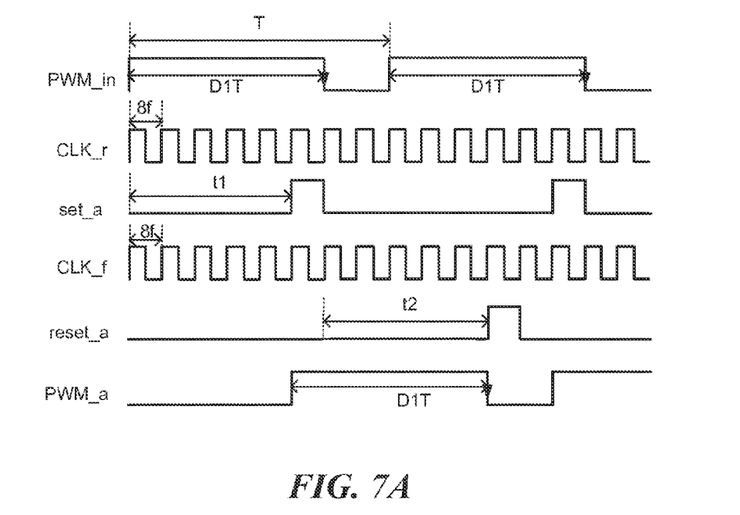
FIG. 7A shows the waveforms of the signals of the circuit in FIG. 5 when the duty cycle of the PWM input signal PWM_in is fixed.

FIG. 7A shows the waveforms of the signals of the circuit in FIG. 5 when the duty cycle of the PWM input signal PWM_in is fixed. In FIG. 7A, the frequency of the rising clock signal CLK_r and the frequency of the falling clock signal CLK_f are both 8f, and the duty cycle of the PWM input signal PWM_in is fixed to D1. In one embodiment, the phase-shift dimming circuit in FIGS. 2A and 2B generates 8 phase-shifted PWM output signals based on the PWM input signal PWM_in. Because the duty cycle of the PWM input signal PWM_in is fixed to D1, the second counter 405 will not be reset by the falling edge of the PWM input signal PWM_in of the next cycle when the second counter 405 is counting the falling clock signal CLK_f corresponding to the PWM input signal PWM_in of the current cycle. In FIG. 7A, PWM_a represents one of the PWM output signals having a phase difference of (5/8)T with the PWM input signal PWM_in, set_a represents the corresponding set signal of the PWM output signal PWM_a and reset_a represents the corresponding reset signal of the PWM output signal PWM_a. Because the delay time between the pulse of the set signal set_a and the rising edge of the PWM input signal PWM_in is (5/8)T, and the delay time between the pulse of the reset signal reset_a and the falling edge of the PWM input signal PWM_in is also (5/8)T, the duty cycle of the PWM output signal PWM_a is D1 too, wherein the rising edge of the pulses of the PWM output signal PWM_a is based on the corresponding pulses of the set signal set_a, and the falling edge of the pulses of the PWM output signal PWM_a is based on the corresponding pulses of the reset signal reset_a. Meanwhile the phase difference between the PWM input signal PWM_in and the PWM output signal PWM_a is (5/8)T.

In some embodiments, the phase difference between the adjacent PWM output signal could be adjusted by changing the frequency of the rising clock signal CLK_r and the falling clock signal CLK_f. For example, if the frequency of the rising clock signal CLK_r and the frequency of the falling clock signal CLK_f are 16f, then the phase difference between the two successive PWM output signals is T/16.

Figure 7B:
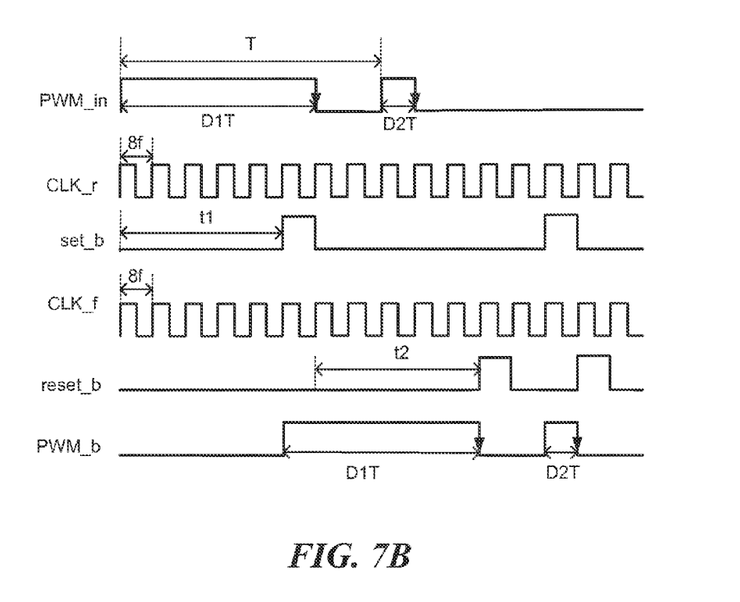
FIG. 7B shows the waveforms of the signals of the circuit in FIG. 5 when the duty cycle of the PWM input signal PWM_in varies.

FIG. 7B shows the waveforms of the signals of the circuit in FIG. 5 when the duty cycle of the PWM input signal PWM_in varies. In FIG. 7B, the frequency of the rising clock signal CLK_r and the frequency of the falling clock signal CLK_f are both 8f, and the duty cycle of the PWM input signal PWM_in is D1 in the first cycle and is D2 in the second cycle. In one embodiment, the phase-shift dimming circuit in FIG. 2B generates 8 phase-shifted PWM output signals based on the PWM input signal PWM_in. Because D1>D2, the second counter 405 will be reset by the falling edge of the PWM input signal PWM_in of the next cycle when the second counter 405 is counting the falling clock signal CLK_f corresponding to the PWM input signal PWM_in of the current cycle. The feedback control circuit 206 is configured to eliminate the influence of the falling edge of the PWM input signal PWM_in of the next cycle. In FIG. 7B, PWM_b represents one of the PWM output signal having a phase difference of (5/8)T with the PWM input signal PWM_in, set_b represents the corresponding set signal of the PWM output signal PWM_b and reset_b represents the corresponding reset signal of the PWM output signal PWM_b. Because the delay time between the pulse of the set signal set_b and the pulse of the PWM input signal PWM_in is t1 (5/8)T, and the rising edge of the reset signal reset_b and the falling edge of the PWM input signal PWM_in is t2 (t2=t1), the duty cycle of the PWM output signal PWM_b is D1 in the first cycle, and is D2 in the second cycle, wherein the rising edge of the pulses (high level) of the PWM output signal PWM_b is based on the corresponding pulses of the set signal set_b, and the falling edge of the pulses of the PWM output signal PWM_b is based on the corresponding pulses of the reset signal reset_b. Meanwhile the phase difference between the PWM input signal PWM_in and the PWM output signal PWM_b is (5/8)T.

In some embodiments, the phase difference between the adjacent PWM output signals could be adjusted by changing the frequency of the rising clock signal CLK_r and the falling clock signal CLK_f. For example, if the frequency of the rising clock signal CLK_r and the frequency of the falling clock signal CLK_f are 16f, then the phase difference between two successive PWM output signals is T/16.

Figure 7C:
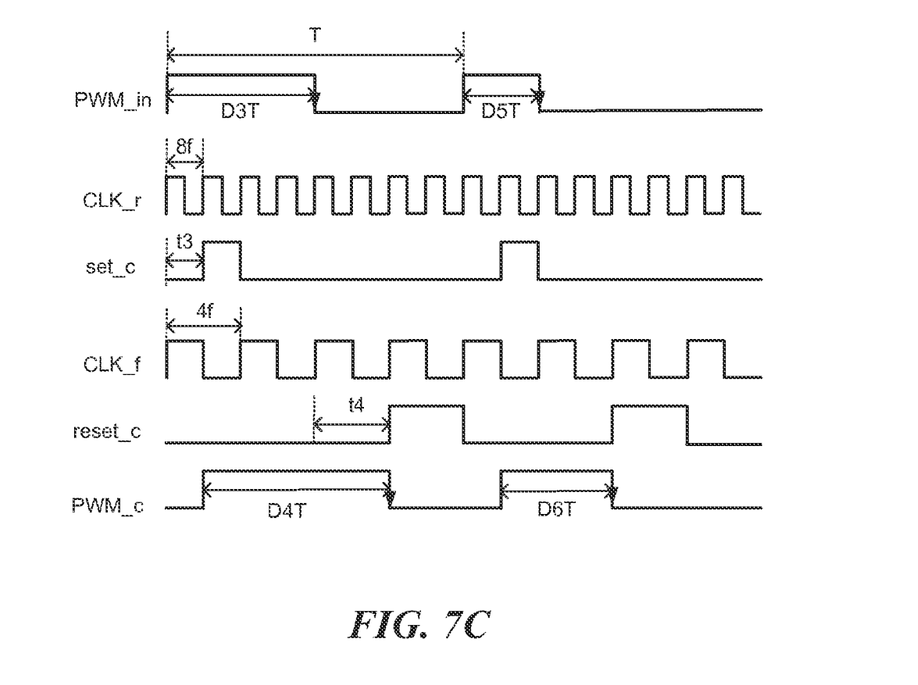
FIG. 7C shows the waveforms of the signals of the circuit in FIG. 5 when the duty cycle of the PWM input signal PWM_in varies and the duty cycle of the PWM output signal is changed compared with the PWM input signal PWM_in.

FIG. 7C shows the waveforms of the signals of the circuit in FIG. 5 when the duty cycle of the PWM input signal PWM_in varies and the duty cycle of the PWM output signal is changed compared with the PWM input signal PWM_in. The duty cycle of the PWM output signals varies because the frequency of the rising clock signal CLK_r and the frequency of the falling clock signal CLK_f are different.

In one embodiment, the frequency of the rising clock signal CLK_r is 8f, while the frequency of the falling clock signal CLK_f is 4f. The duty cycle of the PWM input signal PWM_in is D3 in the first cycle and is D5 in the second cycle. In one embodiment, the phase-shift dimming circuit in FIG. 2B generates 8 phase-shifted PWM output signals with different duty cycle based on the PWM input signal PWM_in. In FIG. 7C, PWM_c represents one of the PWM output signals having a phase difference of T/8 with the PWM input signal PWM_in, set_c represents the corresponding set signal of the PWM output signal PWM_c and reset_c represents the corresponding reset signal of the PWM output signal PWM_c, wherein the delay time between the pulse of set_c and the rising edge of the PWM input signal PWM_in is t3, and the delay time between the pulse of reset_c and the falling edge of the PWM input signal PWM_in is t4. In this embodiment, t3=(1/8)T, t4=(1/4)T, D3=1/2 and D5=1/4. The phase difference between the PWM output signal PWM_c and the PWM input signal PWM_in is T/8, while the duty cycle of the PWM output signal PWM_c is ⅝ in the first cycle and is ⅜ in the second cycle.

In some embodiments, the phase difference and the duty cycle of the PWM output signals could be adjusted by changing the frequency of the rising clock signal CLK_r and the falling clock signal CLK_f. For example, if the frequency of the rising clock signal CLK_r is 16f, and the frequency of the falling clock signal CLK_f is 8f, then the phase difference between two successive PWM output signals is T/16, and the duty cycles of the PWM output signals are different.

Figure 8:
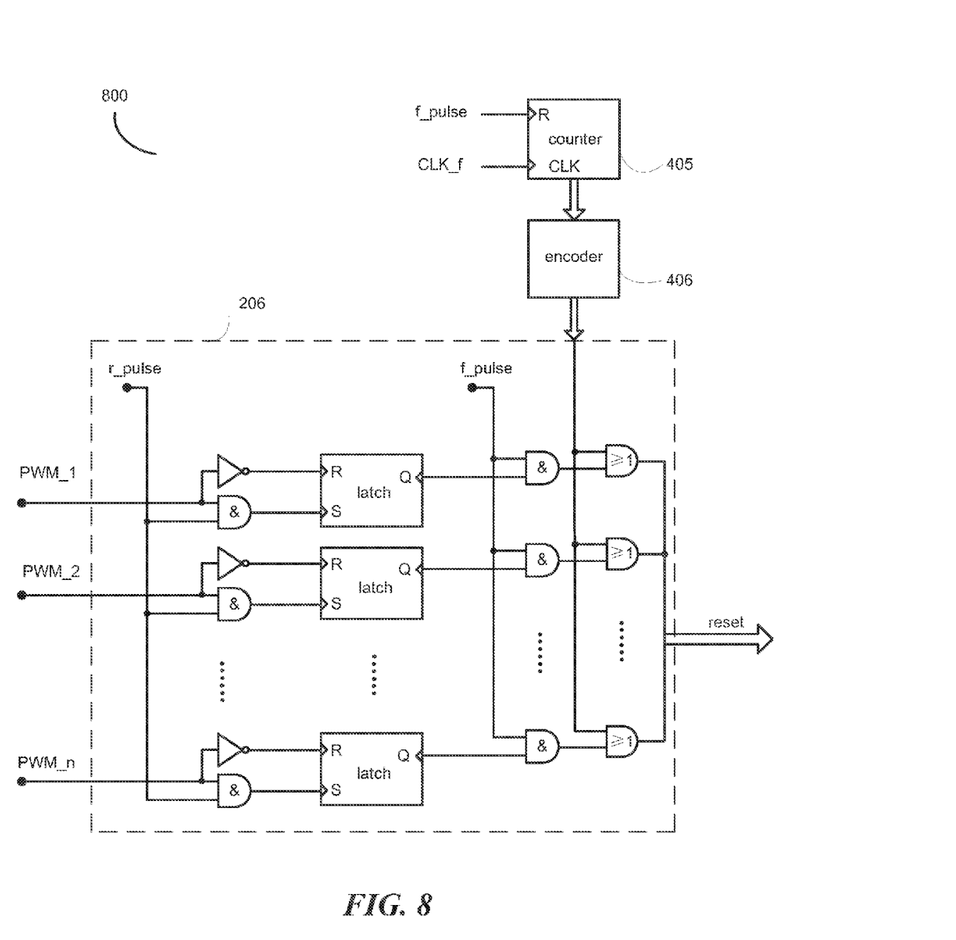
FIG. 8 schematically shows another circuit configuration of the feedback control circuit 206 in accordance with an embodiment of the present invention.

FIG. 8 schematically shows another circuit configuration of the feedback control circuit 206 in accordance with an embodiment of the present invention. In FIG. 8, the feedback control circuit 206 comprises n logic circuits. Each logic circuit comprises a latch and several logic gates. In one hand, the PWM output signals are fed back to the feedback control circuit 206. For example, the PWM output signal PWM_1 and the rising-edge pulse signal r_pulse are provided to the input terminals of an AND gate. The output signal of the AND gate is provided to a set terminal "S" of the latch. In the other hand, the PWM output signals are inverted by an inverter. For example, the PWM output signal PWM_1 is inverted to be a reversed PWM output signal. The reversed PWM output signal is provided to a reset terminal "R" of the latch. Then the signal at the output terminal "Q" of the latch combined with the falling-edge pulse signal f pulse are provided to input terminals of another AND gate to generate a signal to an input terminal of an OR gate which has another input terminal configured to receive the output of the second encoder 406. The reset signal reset_1 is generated by the OR gate. Other reset signals reset_2, reset_3, ... reset_n are generated by the similar way and are not discussed here for brevity.

If the duty cycle of the PWM input signal PWM_in is fixed, the second counter 405 will not be reset by the falling edge of the PWM input signal PWM_in of the next cycle, and provides the binary digit signal with M bits to the second encoder 406. Then the second encoder 406 generates 2M reset signals to the latches 2021~202n. If the duty cycle of the PWM input signal PWM_in varies, and the second counter 405 is reset by the falling edge of the PWM input signal PWM_in of the next cycle, then the feedback control circuit 206 provides the reset signals at the falling edge of the PWM input signal PWM_in of the next cycle. So the embodiment in FIG. 8 could generate phase-shifted PWM output signals with different duty cycles.

Figure 9:
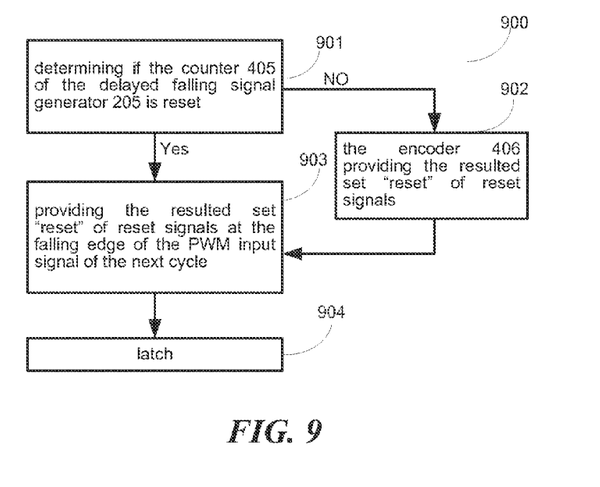
FIG. 9 shows a flow chart 900 of the control scheme of the circuit in FIG. 8.

FIG. 9 shows a flow chart 900 of the control scheme of the circuit in FIG. 8. Step 901, determining if the second counter 405 of the delayed falling signal generator 205 is reset, in other words, determining if the second counter 405 is reset by the falling edge of the PWM input signal PWM_in of the next cycle. If not, go to step 902, the second encoder 406 provides the set "reset" of reset signals to the latch 904.

If the second counter 405 is reset by the falling edge of the PWM input signal PWM_in of the next cycle, then go to step 903, the feedback control circuit provides the set "reset" of reset signals to the latch 904 at the falling edge of the PWM input signal of the next cycle.

Figure 10:
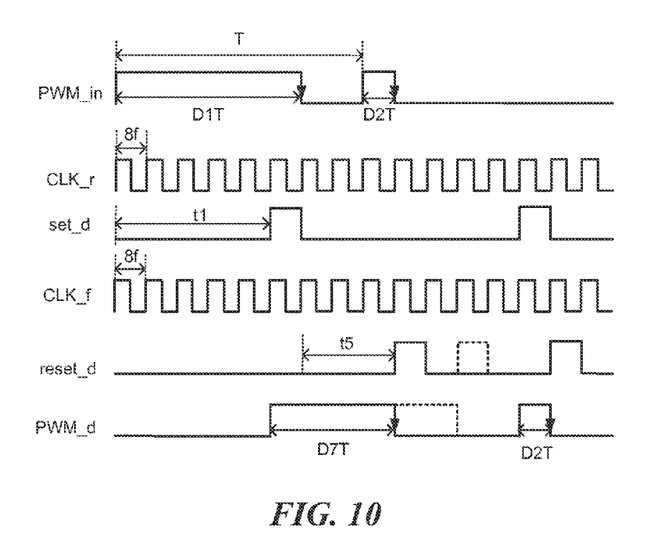
FIG. 10 shows the waveforms of the signals of the circuit in FIG. 8.

FIG. 10 shows the waveforms of the signals of the circuit in FIG. 8. In one embodiment, the frequency of the rising clock signal CLK_r and the frequency of the falling clock signal CLK_f are both 8f, and the duty cycle of the PWM input signal PWM_in is D1 in the first cycle and is D2 in the second cycle. Because D1>D2, the second counter 405 will be reset by the falling edge of the PWM input signal PWM_in of next cycle when the second counter 405 is counting the falling clock signal CLK_f corresponding to the PWM input signal PWM_in of the current cycle. The feedback control circuit 206 in FIG. 8 is configured to provide a reset signal reset_d at the falling edge of the PWM input signal of the next cycle. The waveform of PWM_b with solid line represents one of the PWM output signals whose pulse (high level) is ended at the falling edge of the PWM input signal PWM_in. The waveforms of reset_d with dashed line and PWM_d with dashed line represent signals generated by the circuit in FIG. 7B. As shown in FIG. 10, the delay time between the falling edge of the PWM input signal PWM_in of the current cycle and the rising edge of the reset signal reset_d is t5(t5<t1), so that the duty cycle of the PWM output signal PWM_d is changed to D7 (D7<D1). The phase difference between the PWM input signal PWM_in and the PWM output signal PWM_d is (⅝)T.

In some embodiments, when the frequency of the rising clock signal CLK_r and the frequency of the falling clock signal CLK_f are different, the PWM output signals may be reset by the falling edge of the PWM input signal PWM_in of the next cycle, too.

An effective technique for phase-shift dimming method in LED controller has been disclosed. While specific embodiments of the present invention have been provided, it is to be understood that these embodiments are for illustration purposes and not limiting. Many additional embodiments will be apparent to persons of ordinary skill in the art reading this invention.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A phase-shift dimming control circuit, comprising:
a frequency multiply circuit configured to receive a PWM input signal to provide a square signal having a frequency at least two times higher than that of the PWM input signal;
a delayed rising signal generator configured to receive the square signal and the PWM input signal to provide a plurality of set signals having pulses;
a delayed falling signal generator configured to receive the square signal and the PWM input signal to provide a plurality of reset signals having pulses;
a plurality of latches configured to respectively receive the plurality of pairs of set signal and reset signal to generate a corresponding plurality of PWM output signals, each of the PWM output signals having pulses, and wherein the rising edge of the pulses of the PWM output signals is based on the corresponding set signal pulses, and the falling edge of the pulses of the PWM output signals is based on the corresponding reset signal pulses;
wherein the delayed rising signal generator comprises:
a rising-edge pulse generator configured to receive the PWM input signal to provide a rising-edge pulse signal having a pulse at every rising edge of the PWM input signal;
a rising-edge clock generator configured to receive the square signal to generate a rising clock signal having a cycle length corresponding to a phase difference between two successive PWM output signals;
a counter configured to count the rising clock signal to generate a M bits binary digit signal, M being a positive integer; and
an encoder configured to encode the M bits binary digit signal to 2M set signals.

2. A phase-shift dimming control circuit, comprising:
a frequency multiply circuit configured to receive a PWM input signal to provide a square signal having a frequency at least two times higher than that of the PWM input signal;
a delayed rising signal generator configured to receive the square signal and the PWM input signal to provide a plurality of set signals having pulses;
a delayed falling signal generator configured to receive the square signal and the PWM input signal to provide a plurality of reset signals having pulses;
a plurality of latches configured to respectively receive the plurality of pairs of set signal and reset signal to generate a corresponding plurality of PWM output signals, each of the PWM output signals having pulses, and wherein the rising edge of the pulses of the PWM output signals is based on the corresponding set signal pulses, and the falling edge of the pulses of the PWM output signals is based on the corresponding reset signal pulses;
wherein the delayed falling signal generator comprises:
a falling-edge pulse generator configured to receive the PWM input signal, and to provide a falling-edge pulse signal which has a pulse at every falling edge of the PWM input signal;
a falling-edge clock generator configured to receive the square signal, and to generate a falling clock signal having a cycle length corresponding to a phase difference between two successive PWM output signals;
a counter configured to count the falling clock signal to generate a M bits binary digit signal, M being a positive integer; and
an encoder configured to encode the M bits binary digit signal to a first set of 2M reset signals.

3. The phase-shift dimming control circuit of claim 2, wherein the delayed rising signal generator further comprises a feedback control circuit coupled between the delayed falling signal generator and the plurality of latches, and wherein the delayed falling signal generator receives the falling-edge pulse signal provided by the falling-edge pulse generator, the plurality of reset signals provided by the delayed falling signal generator and the plurality of PWM output signals, and wherein based on the falling edge pulse signal, the plurality of reset signals and the plurality of PWM output signals, the feedback control circuit respectively provides a plurality of updated reset signals to the plurality of latches.

* * * * *